United States Patent
Cruz-Hernandez et al.

(10) Patent No.: US 9,489,046 B2
(45) Date of Patent: Nov. 8, 2016

(54) METHOD AND APPARATUS FOR PROVIDING HAPTIC FEEDBACK TO NON-INPUT LOCATIONS

(75) Inventors: Juan Manuel Cruz-Hernandez, Montreal (CA); Andrew Gosline, Montreal (CA); Danny Grant, Laval (CA); Christophe Ramstein, San Francisco, CA (US)

(73) Assignee: IMMERSION CORPORATION, San Jose, CA (US)

( * ) Notice: Subject to any disclaimer, the term of this patent is extended or adjusted under 35 U.S.C. 154(b) by 1046 days.

(21) Appl. No.: 12/773,453

(22) Filed: May 4, 2010

(65) Prior Publication Data
US 2010/0277430 A1      Nov. 4, 2010

Related U.S. Application Data

(60) Provisional application No. 61/175,454, filed on May 4, 2009.

(51) Int. Cl.
*G06F 3/01* (2006.01)
*G06F 1/16* (2006.01)

(52) U.S. Cl.
CPC ............ *G06F 3/016* (2013.01); *G06F 1/1626* (2013.01); *G06F 3/011* (2013.01); *G06F 3/01* (2013.01)

(58) Field of Classification Search
CPC ........ G06F 3/033; G06F 3/041; G06F 3/016; G06F 3/04886; G06F 1/1626; G06F 3/011; G06F 2203/014
USPC ............... 345/156, 157, 160, 168, 169, 173; 178/18.01, 18.03, 18.06, 18.04; 463/16, 30, 37, 168; 340/407.1, 407.2; 715/701, 702, 764, 773, 863; 361/679.01
See application file for complete search history.

(56) References Cited

U.S. PATENT DOCUMENTS

| | | | |
|---|---|---|---|
| 8,686,952 B2* | 4/2014 | Burrough et al. | 345/173 |
| 8,786,409 B2* | 7/2014 | Zwart et al. | 340/12.1 |
| 2002/0149561 A1* | 10/2002 | Fukumoto et al. | 345/156 |
| 2003/0048250 A1* | 3/2003 | Boon et al. | 345/156 |
| 2003/0184574 A1* | 10/2003 | Phillips et al. | 345/702 |
| 2004/0008191 A1* | 1/2004 | Poupyrev et al. | 345/184 |
| 2004/0012560 A1* | 1/2004 | Jasso et al. | 345/156 |
| 2004/0075676 A1* | 4/2004 | Rosenberg et al. | 345/701 |
| 2004/0160414 A1* | 8/2004 | Armstrong | 345/156 |
| 2004/0164954 A1* | 8/2004 | Rekimoto | 345/156 |
| 2004/0233161 A1* | 11/2004 | Shahoian et al. | 345/156 |

(Continued)

OTHER PUBLICATIONS

Norio Nakamura et al.; "An Innovative Non-grounding Haptic Interface 'GyroCubeSensuous' displaying Illusion Sensation of Push, Pull and Lift"; National Institute of Advanced Industrial Science and Technology; University of Tsukuba; ACM; New York; 2005.

(Continued)

*Primary Examiner* — Michael J Eurice
(74) *Attorney, Agent, or Firm* — Miles & Stockbridge P.C.

(57) ABSTRACT

A handheld apparatus includes a top surface that includes a touch screen defining a plurality of keys, and a bottom surface on an opposite side of the first surface. The apparatus further includes a processor and an actuator coupled to the processor and located on the bottom surface. The processor is adapted to detect an object moving across the keys and in response generate an actuation signal to the actuator to generate a haptic feedback on the back surface.

12 Claims, 16 Drawing Sheets

(56) References Cited

U.S. PATENT DOCUMENTS

| | | | |
|---|---|---|---|
| 2005/0007347 A1* | 1/2005 | Anastas et al. | 345/167 |
| 2005/0046551 A1* | 3/2005 | Cranfill et al. | 340/407.1 |
| 2005/0047621 A1* | 3/2005 | Cranfill et al. | 381/334 |
| 2005/0093846 A1* | 5/2005 | Marcus et al. | 345/184 |
| 2006/0026536 A1* | 2/2006 | Hotelling et al. | 715/863 |
| 2006/0028095 A1* | 2/2006 | Maruyama et al. | 310/316.01 |
| 2006/0049920 A1* | 3/2006 | Sadler et al. | 340/407.1 |
| 2006/0109256 A1* | 5/2006 | Grant et al. | 345/173 |
| 2006/0119586 A1* | 6/2006 | Grant et al. | 345/173 |
| 2006/0152497 A1* | 7/2006 | Rekimoto | 345/173 |
| 2006/0187215 A1* | 8/2006 | Rosenberg et al. | 345/173 |
| 2006/0192771 A1* | 8/2006 | Rosenberg et al. | 345/173 |
| 2006/0238069 A1* | 10/2006 | Maruyama et al. | 310/316.01 |
| 2006/0256090 A1* | 11/2006 | Huppi | 345/173 |
| 2007/0013677 A1* | 1/2007 | Rosenberg et al. | 345/173 |
| 2007/0040815 A1* | 2/2007 | Rosenberg et al. | 345/173 |
| 2007/0080608 A1* | 4/2007 | Maruyama et al. | 310/317 |
| 2007/0096594 A1* | 5/2007 | Maruyama et al. | 310/317 |
| 2007/0178942 A1* | 8/2007 | Sadler et al. | 455/567 |
| 2007/0229478 A1* | 10/2007 | Rosenberg et al. | 345/173 |
| 2007/0229483 A1* | 10/2007 | Rosenberg et al. | 345/204 |
| 2007/0232348 A1* | 10/2007 | Tierling et al. | 455/550.1 |
| 2007/0244641 A1 | 10/2007 | Altan et al. | |
| 2008/0018614 A1* | 1/2008 | Rekimoto | 345/173 |
| 2008/0019122 A1* | 1/2008 | Kramer | 362/154 |
| 2008/0024459 A1* | 1/2008 | Poupyrev et al. | 345/173 |
| 2008/0062122 A1* | 3/2008 | Rosenberg et al. | 345/156 |
| 2008/0062145 A1* | 3/2008 | Shahoian et al. | 345/173 |
| 2008/0068348 A1* | 3/2008 | Rosenberg et al. | 345/173 |
| 2008/0068349 A1* | 3/2008 | Rosenberg et al. | 345/173 |
| 2008/0068350 A1* | 3/2008 | Rosenberg et al. | 345/173 |
| 2008/0068351 A1* | 3/2008 | Rosenberg et al. | 345/173 |
| 2008/0100568 A1* | 5/2008 | Koch et al. | 345/156 |
| 2008/0111788 A1* | 5/2008 | Rosenberg et al. | 345/156 |
| 2008/0132313 A1* | 6/2008 | Rasmussen et al. | 463/16 |
| 2008/0251364 A1* | 10/2008 | Takala et al. | 200/341 |
| 2009/0015555 A1* | 1/2009 | Takashima et al. | 345/158 |
| 2009/0072662 A1* | 3/2009 | Sadler et al. | 310/319 |
| 2009/0079698 A1* | 3/2009 | Takashima et al. | 345/169 |
| 2009/0103250 A1* | 4/2009 | Takashima et al. | 361/679.02 |

OTHER PUBLICATIONS

Norio Nakamura et al.; "Development of a Force and Torque Hybrid Display 'GyroCubeStick' "; Proceedings of the First Joint Eurohaptics Conference and Symposium on Haptic Interfaces for Virtual Environment and Teleoperator Systems; 2005 IEEE.

Norio Nakamura et al.; "Development of Fingertip Type Non-grounding Force Feedback Display"; Second Joint EuroHaptics Conference and Symposium on Haptic Interfaces for Virtual Environment and Teleoperator Systems (WHC'07); 2007 IEEE.

Colin Sindwells et al.; "TorqueBAR: An Ungrounded Haptic Feedback Device"; ICMI'03; Nov. 5-7, 2003; Vancouver, British Columbia, Canada; Copyright 2003 ACM 1-58113-621-8/03/0011.

Tomohiro Amemiya et al.; "Virtual Force Display: Direction Guidance using Asymmetric Acceleration via Periodic Translational Motion"; Proceedings of the First Joint Eurohaptics Conference and Symposium on Haptic Interfaces for Virtual Environment and Teleoperator Systems; 2005 IEEE.

Tomohiro Amemiya et al.; "Lead-Me Interface for a Pulling Sensation from Hand-held Devices"; ACM Transactions on Applied Perceptions; vol. 5; No. 3; Article 15; Publication Date: Aug. 2008; pp. 15-15:17.

Tomohiro Amemiya; "Haptic Direction Indicator for Visually Impaired People Based on Pseudo-Attraction Force"; vol. I No. 5; Mar. 2009; ISSN: 1697-9613; pp. 23-34.

Olivier Bau et al.; "BubbleWrap: A Textile-Based Electromagnetic Haptic Display" CHI 2009; Apr. 4-9, 2009; Boston, Massachusetts, USA; ACM 978-1-60558-247-4/09/04.

Hiroaki Yano et al.; "Development of a Non-grounded Haptic Interface Using the Gyro Effect"; Proceedings of the 11th Symposium on Haptic Interfaces for Virtual Environment and Teleoperator Systems (HAPTICS'03); 2003 IEEE pp. 1-8.

Fabian Hemmert et al.; "Shape-Changing Mobiles: Tapering in One-Dimensional Deformational Displays in Mobile Phones"; TEI 2010; Jan. 25-27, 2010, Cambridge, Massachusetts, USA; copyright 2010 ACM 978-1-60558-841-4/10/01; pp. 249-252.

Fabian Hemmert et al.; "Dynamic Knobs: Shape Change as a Means of Interaction on a Mobile Phone"; CHI 2008; Apr. 5-10, 2008; Florence, Italy; ACM 978-1-60558-012-8/08/04.; pp. 2309-2314.

"Touch User Interface—Touch Screen and Multi Touch"; Jun. 12, 2009; http://www.touchuserinterface.com2009/06/shape-changing-mobile-phone-concept.html.

G. Michelitsch et al.; "Haptic Chameleon: A New Concept of Shape-Changing User Interface Controls with Force Feedback"; CHI 2004; Apr. 24-29, 2004; Vienna, Austria; ACM 1-58113-703-6/04/0004; pp. 1305-1308.

* cited by examiner

METHOD AND APPARATUS FOR PROVIDING HAPTIC FEEDBACK TO NON-INPUT LOCATIONS

RELATED APPLICATIONS

This application claims priority to U.S. Provisional Patent Application No. 61/175,454 filed May 4, 2009, the specification of which is herein incorporated by reference.

FIELD

The invention generally relates to an apparatus and a method for providing haptic feedback.

BACKGROUND INFORMATION

Handheld electronic devices, such as mobile phones, personal digital assistants (PDAs), pocket personal computers (PCs), gamepads, and camcorders, generally have multiple of buttons that allow one to interface with the device by inputting information. The capabilities of these devices are increasing while their size and weight are decreasing to enhance their portability. For example, mobile phones, in addition to their traditional role as voice-communication devices, now include functions traditionally associated with other devices, such as electronic games, PDAs, and digital cameras. At the same time, consumers seek smaller, lighter devices.

To support these multiple functions, a screen display is often used. Thus, the area on devices devoted to user input, i.e., the activating or input area, is becoming increasingly complex in terms of the number of functions available to be input, while the physical size of the input area is decreasing. Moreover, the available size of the input area must compete with the size of the visual display.

To permit effective interaction with these devices, visual and audio cues or feedback are provided by the conventional device. In addition to conventional visual and audio feedback, some of these devices attempt to enhance the effectiveness of device feedback by providing tactile cues or feedback. Some devices utilize structural tactile methods. One such example is to provide raised surfaces on the input surface, e.g., keypad, of the device. Such methods, however, are inherently static and thus cannot offer a wide array of, or effective, tactile feedback.

Active methods of providing tactile feedback include incorporating haptics into handheld electronic devices. These active methods of providing haptic cues generally include vibrating the entire device. Some devices have incorporated haptic feedback into a surface of the device instead of vibrating the entire device. In such devices, the haptic feedback is provided to the input area, i.e., the activating area. However, the limited size of the input area in a handheld device provides a very limited area in which to provide meaningful haptic feedback. Furthermore, the amount of physical contact with the input area is generally limited to a small surface of a finger while inputting information to the device. Moreover, in typical active methods, the frequencies at which the devices are vibrated have been in very limited ranges—typically between 20 Hz and 28 Hz. The number of haptic cues that can be conveyed in such a range is very limited.

SUMMARY

One embodiment is a handheld apparatus that includes a top surface that includes a touch screen defining a plurality of keys, and a bottom surface on an opposite side of the first surface. The apparatus further includes a processor and an actuator coupled to the processor and located on the bottom surface. The processor is adapted to detect an object moving across the keys and in response generate an actuation signal to the actuator to generate a haptic feedback on the back surface.

DETAILED DESCRIPTION

Embodiments of the present invention include products and processes for providing haptic feedback at an area different than the input area. In some interface devices, kinesthetic feedback (such as, without limitation, active and passive force feedback), and/or tactile feedback (such as, without limitation, vibration, texture, and heat), is also provided to the user, more generally known collectively as "haptic feedback." In certain embodiments, haptic feedback is provided only at an area different from the input area. In other embodiments, haptic feedback is also provided at the input area. The invention may be embodied in handheld devices, such as mobile phone, PDAs, pagers, and camcorders, but may be embodied in other devices as well.

Figure 1:
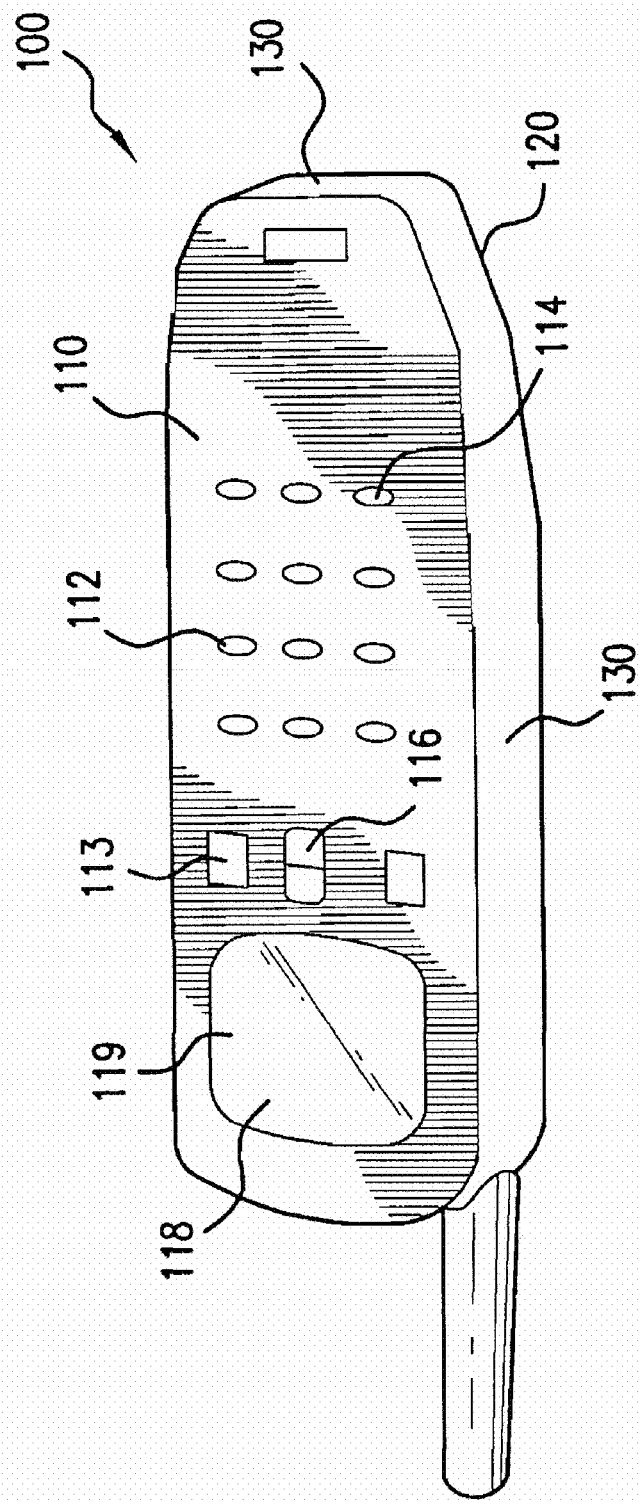
FIG. 1 is a perspective view of a mobile phone according to an embodiment of the present invention.

FIG. 1 is a perspective view showing a mobile phone 100 according to an embodiment of the present invention. The phone 100 includes a first surface 110, a second surface 120, and a plurality of walls 130. The plurality of walls 130 define a volume 140 (shown in FIGS. 3 and 4). As shown in FIG. 1, the walls 130 are coupled to the first surface 110 and the second surface 120. The first surface 110 and the second surface 120 may be distinct. While the first and second surfaces 110, 120 shown in FIG. 1 are separate from one another. In an alternate embodiment, the first and second surfaces 110, 120 can be contiguous.

The embodiment shown in FIGS. 1-4 includes a means for receiving an input signal. The means for receiving an input signal includes means for detecting a plurality of distinct pressures. The means for receiving an input signal and the means for detecting a plurality of distinct pressures in the embodiment shown in the FIG. 1 includes a keypad 114, a switch 116, and a touch-sensitive screen 118. The keypad 114, the switch 116, and the touch-sensitive screen 118 are described further below. Other means for receiving an input signal and means for detecting a plurality of distinct pressures may be used in other embodiments, for example, a D-pad, scroll wheel, and toggle switch. Structures described herein for receiving an input signal and for detecting a plurality of distinct pressures, or other structures may be used. Any suitable structure that can receive an input signal and that can detect a plurality of distinct pressures may be used.

Disposed in the first surface 110 are several input elements 112. Other embodiments may include one input element (such as a touch-screen). The input elements 112 shown in FIG. 1 include the keypad 114, switch 116, and touch-sensitive screen 118. The touch-sensitive screen 118 is disposed in a video display screen 119. In other embodiments, input elements can include, for example, D-pads, scroll wheels, and toggle switches.

Information—through the generation of a signal—is generally input into the phone 100 through the input elements 112 disposed in the first surface 110 (hereinafter referred to as the "input surface"). Information can be input by physically contacting the input elements 112 with a digit of a hand, or with a device, such as a stylus. Alternatively, data can be input in the phone 100 remotely. For example, data can be transmitted wirelessly from a remote processor (not shown) to the phone 100. In another example, the phone 100 can be placed in a cradle-like device (not shown), which is operative to communicate with the remote processor and the phone 100. Data can be entered into the phone 100 placed in the cradle-like device through the remote processor by keying in data on a keyboard, which is operative to communicate with the remote processor.

Figure 2:
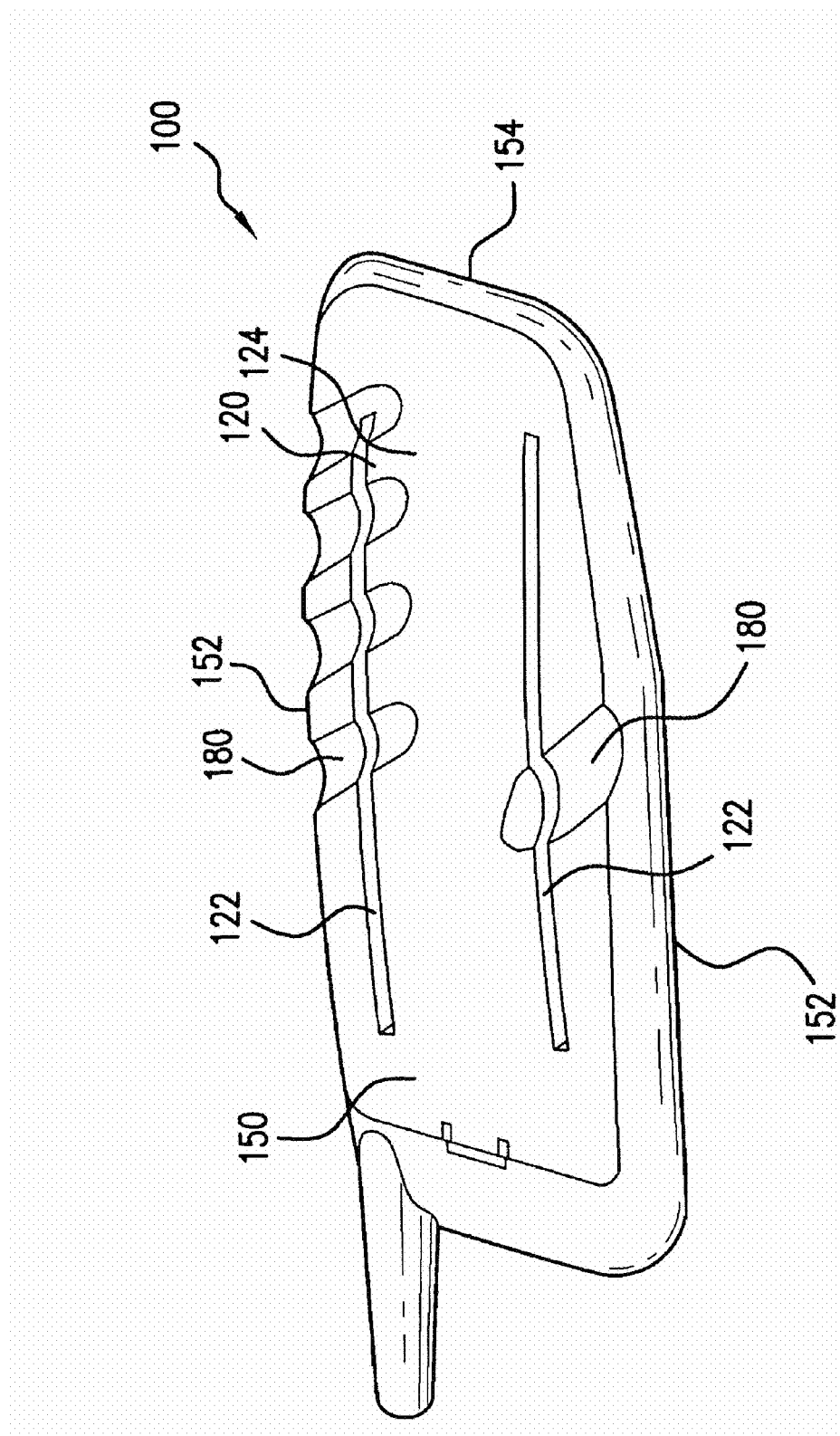
FIG. 2 is a perspective view of a surface of an off-activating area of the mobile phone of FIG. 1.

FIG. 2 shows an exterior surface 124 of the second surface 120 (hereinafter referred to as the "off-activating surface" to indicate that it is different from the input surface) of the phone 100. The off-activating surface 120 is formed from a battery cover panel 150. Alternatively, an off-activating surface can be formed of a separate panel (not shown) coupled with the phone. The off-activating surface 120 shown is formed of a flexible material. Alternatively, the off-activating surface 120 can include a flexural member. In one embodiment, the off-activating surface 120 is formed of plastic. Alternatively, any other suitable material can be used.

In the embodiment shown in FIG. 2, two grooves 122 are disposed in the off-activating surface 120. The grooves 122 increase the flexibility of the off-activating surface 120. The term "flexibility" refers to any displacement that is generally perceptible—by sight, sound, or touch—to one observing or holding the phone. Increased flexibility of the off-activating surface 120 provides a greater range of frequencies—especially those frequencies detectable by the hand—at which the off-activating surface 120 can vibrate. Preferably, the grooves 122 are disposed through an entire thickness of the off-activating surface 120. Alternatively, the grooves 122 can be disposed partially through the off-activating surface 120. The grooves 122 can be formed in the off-activating surface 120 during molding of the battery cover panel 150. Alternatively, the grooves 122 can be formed into the battery cover panel 150 subsequent to molding the battery cover panel 150.

In one embodiment, the grooves 122 extend substantially along a major length of the battery cover panel 150. Alternatively, the grooves 122 can extend in any suitable length along the battery cover panel 150. In one embodiment, the grooves 122 are disposed substantially parallel and proximate to the edges 152 of the battery cover panel 150. Alternatively, the grooves 122 can be disposed in any other suitable configuration. The configuration, i.e., length, depth, shape, number and position of the grooves 122 can be varied to obtain the desired resonant characteristics of the off-activating surface 120.

In one embodiment, formed in the exterior surface 124 of the off-activating surface 120 is a plurality of channels 180. The channels 180 shown are recessed to accept digits of a hand. The channels 180 guide a user's hand when holding the phone 100 and maximize the amount of physical contact between the hand and the off-activating surface 120.

The embodiment shown in FIGS. 1-4 includes a means for providing haptic feedback and a means for producing a plurality of distinct haptic sensations. The means for providing haptic feedback and the means for producing a plurality of distinct haptic sensations in the embodiment shown in FIGS. 1-4 comprises an actuator 160 in combination with a local processor (not shown). The actuator 160 and the local processor are described further below. Other means for providing haptic feedback and for producing a plurality of distinct haptic sensations may be used in other embodiments. For example, a voice coil and a permanent magnet, rotating masses, a piezo material such as quartz, Rochelle Salt, and synthetic polycrystalline ceramics, piezoelectric ceramics, piezoelectric films, and electroactive polymers can be used. Additionally, a remote processor can be used. Structures described herein for providing haptic feedback and for producing a plurality of distinct haptic sensations, or other structures may be used. Any suitable structure that can provide haptic feedback and that can produce a plurality of distinct haptic sensations may be used.

Figure 3:
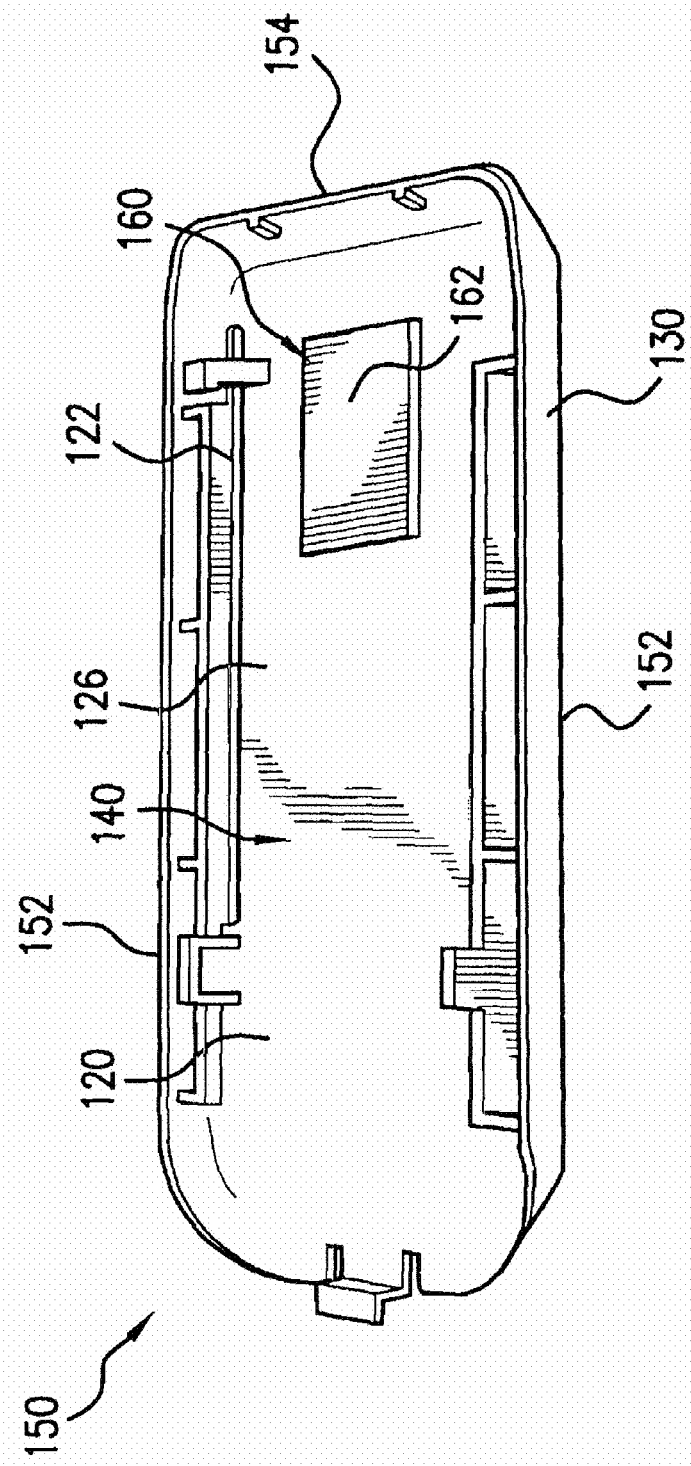
FIG. 3 is a perspective view of another surface of the off-activating area of the mobile phone of FIG. 1.

FIG. 3 is a perspective view of an interior surface 126 of the off-activating surface 120 of the phone 100. As can be seen in FIG. 3, the grooves 122 are disposed entirely through the battery cover panel 150 from the exterior surface 124 of the off-activating surface 120 to the interior surface 126 of the off-activating surface 120. Disposed in the volume 140 is an actuator 160. In other embodiments, two or more actuators are so disposed.

Figure 4:
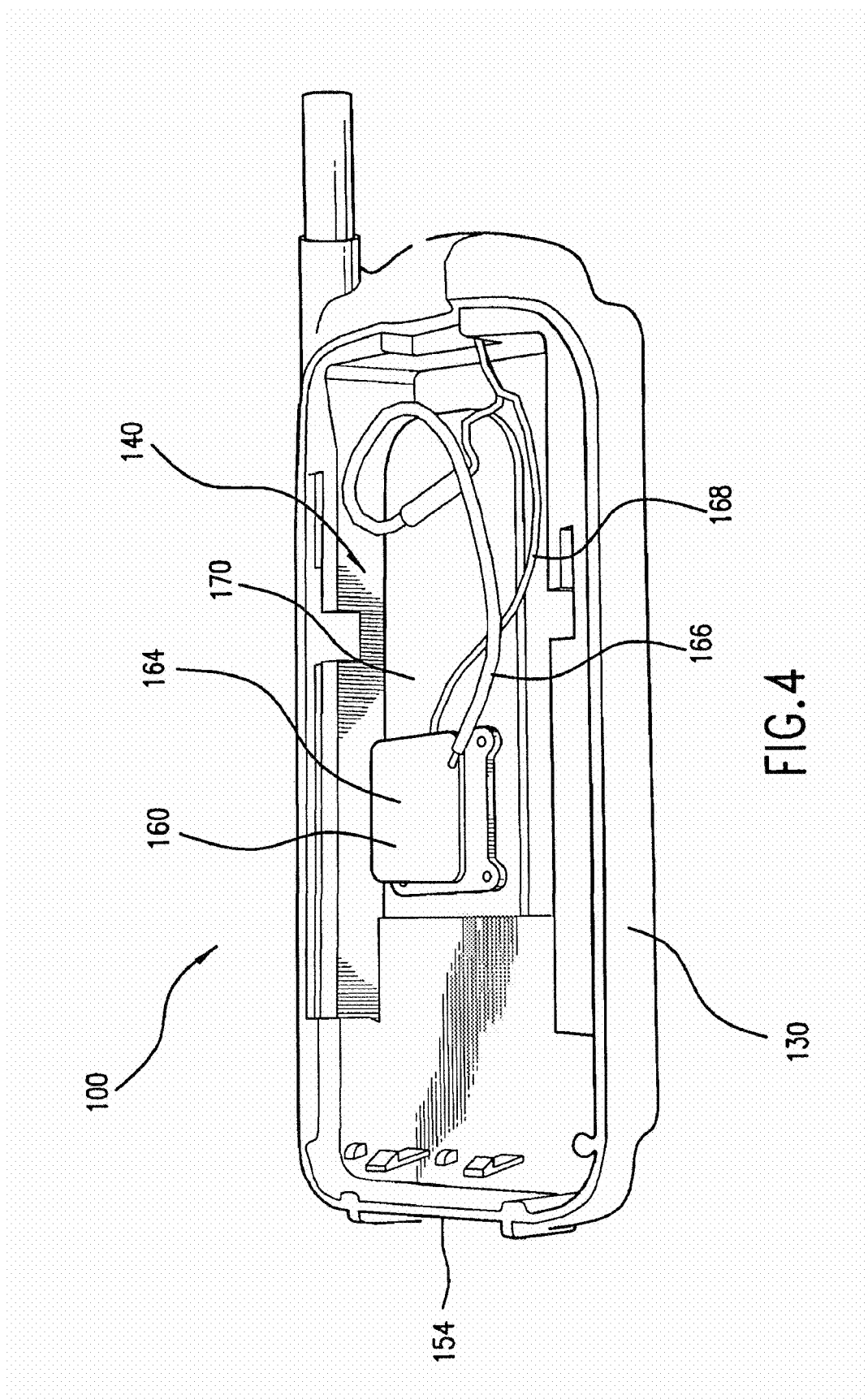
FIG. 4 is a perspective view of an internal surface of the mobile phone of FIG. 1.

The actuator 160 shown in FIGS. 3 and 4 includes an actuator magnet 162 and an actuator voice coil 164. In one embodiment, the actuator magnet 162 is a permanent magnet and the actuator voice coil 164 is an electromagnet. Alternatively, the actuator 160 can be formed of a piezo material such as quartz, Rochelle Salt, and synthetic polycrystalline ceramics. Other alternative actuators can include rotating masses, piezoelectric ceramics, piezoelectric films, and electroactive polymers. Any other suitable actuator can be used. Piezo material is bi-directional in its displacement, and actuates when an electric field is applied to it. In one embodiment, the actuator 160 is disposed proximate the base 154 of the battery cover panel 150. Alternatively, the actuator 160 can be disposed in any other suitable area of the volume 140.

In the embodiment shown in FIG. 3, the actuator 160 is coupled to the off-activating surface 120. As shown in FIG. 3, the actuator 160 is coupled directly to the interior surface 126 of the off-activating surface 120 by the actuator magnet 162. Alternatively, the actuator 160 can be coupled to the off-activating surface 120 by a coupling (not shown), i.e., an intermediary element. Alternatively, the actuator 160 can indirectly, i.e., without a direct physical connection, actuate the off-activating surface 120 by transmitting energy, such as sound waves or electromagnetic pulses, to the off-activating surface 120.

FIG. 4 is a perspective view of an internal surface of the phone 100 of FIGS. 1-3. The actuator voice coil 164 is coupled to a rigid surface 170. In an alternative embodiment, the actuator voice coil 164 is coupled to a dampening member. A dampening member is either inflexible itself or, over a period of time, deadens or restrains physical displacement. The rigid surface 170 is disposed in the volume 140 of the phone 100. In one embodiment, the rigid surface 170 is a PC board of the phone 100. Alternatively, the actuator voice coil 164 can be coupled with any other suitable surface. The actuator voice coil 164 shown is disposed proximate the actuator magnet 162. Alternatively, the actuator voice coil 164 can be disposed in any other suitable location in the volume 140.

The actuator voice coil 164 is electrically connected to the power supply (not shown) of the phone 100—generally the phone 100 is powered by a direct current (DC) power source, such as a battery. The actuator voice coil 164 is electrically connected to the power supply of the phone 100 by a first power supply wire 166 and a second power supply wire 168. Alternatively, the actuator voice coil 164 can have a power source (not shown) separate from the power source of the phone 100.

The rigid surface 170 preferably remains substantially static with respect to the off-activating surface 120. The term "substantially static" does not mean that the rigid surface 170 is completely devoid of any measurable movement. The rigid surface 170 can be displaced when the actuator 160 imparts energy to actuate the off-activating surface 120. Rather, "substantially static" means that any displacement of the rigid surface 170 is generally imperceptible, or only minimally perceptible, to one observing or holding the phone 100. Alternatively, the rigid surface 170 can be displaced when the actuator 160 causes the off-activating surface 120 to actuate such that it is perceptible to one observing or holding the phone 100. The rigid surface 170 can be displaced at a same or different frequency than that at which the off-activating surface 120 actuates.

The actuator 160 shown is operative to actuate the off-activating surface 120 at a frequency in a range between approximately 10 Hz and 300 Hz. When the actuator voice coil 164 is energized by the power source of the phone 100, the actuator magnet 162 is displaced toward the actuator voice coil 164. As the actuator magnet 162 is coupled with the off-activating surface 120, the off-activating surface 120 is also displaced toward the actuator voice coil 164 when the actuator voice coil 164 is energized.

Varying the amount of current to the actuator voice coil 164 can vary the amount of displacement of the actuator magnet 162 toward the actuator voice coil 164. Thus, the amount of displacement of the off-activating surface 120 can be regulated. When the actuator voice coil 164 is de-energized, the actuator magnet 162 is no longer displaced toward the actuator voice coil 164, and returns substantially to its original position. Likewise, the off-activating surface 120 returns substantially to its original position.

Repeatedly energizing and de-energizing the actuator voice coil 164 causes the actuator magnet 162, as well as the off-activating surface, to reciprocate between its original position and a position proximate the actuator voice coil 164. Thus, variations in the current delivered to the actuator voice coil 164 and the period between energizing and de-energizing the actuator voice coil resonates the off-activating surface 120.

The embodiment shown in FIGS. 1-4 includes a means for sending an actuation signal and a means for varying at least one of the frequency, waveform and magnitude of the haptic sensations. The means for sending an actuation signal and the means for varying at least one of the frequency, waveform and magnitude of the haptic sensations comprise the local processor. The local processor is described further below. Other means for determining pressure may be used in other embodiments. Other structures may be used, for example a remote processor. Any structure that can send an actuation signal and that can vary at least one of the frequency, waveform and magnitude can be used.

In one embodiment, a local processor (not shown) controls the actuation of the off-activating surface 120 by regulating the current delivered to the actuator voice coil 164, the duration of the current delivered to the actuator voice coil 164, the time between cycles of energizing the voice coil 164, and the number of cycles of energizing the voice coil 164. These conditions, i.e., frequency, waveform, and magnitude, can be varied to obtain desired resonant characteristics of the off-activating surface 120. Alternatively, the processor can be remote, i.e., separate from the phone 100. Thus, haptic feedback can be provided to the off-activating surface 120.

The local processor monitors the input elements 112 in the phone 100. When a plurality of input elements 112 is included, the processor can either monitor each input element 112 sequentially or in parallel. Monitoring the input elements 112 is preferably done as a continuous loop function.

The processor is in communication with the input elements 112 to receive input signals therefrom. The processor can also receive additional information from the input elements 112, including the position of the input elements 112 and the amount of pressure applied to the input elements 112. In one embodiment, the input signal includes information related to the amount of pressure applied to the input elements 112, information related to the position of the input elements 112, or a combination of information about pressure and position. In addition to being in communication with the input elements 112, the processor is in communication with the actuator 160 to produce a haptic response in the actuator 160 corresponding to the input or input signal received by the actuator 160 from the input elements 112.

The processor is located in a suitable location according to the needs of the device in which it is placed. In one embodiment, the processor is coupled (not shown) to the rigid surface 170. Suitable processors include, for example, digital logical processors capable of processing input, executing algorithms, and generating output as needed to create the desired haptic feedback in the off-activating surface 120 in response to the inputs received from the input elements 112.

Such processors can include a microprocessor, an Application Specific Integrated Circuit (ASIC), and state machines. Such processors include, or can be in communication with media, for example computer readable media, which stores instructions that, when executed by the processor, cause the processor to perform the steps described herein as carried out, or assisted, by a processor.

One embodiment of a suitable computer-readable medium includes an electronic, optical, magnetic, or other storage or transmission device capable of providing a processor, such as the processor in a web server, with computer-readable instructions. Other examples of suitable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, including a router, private or public network, or other transmission device or channel.

Figure 5:
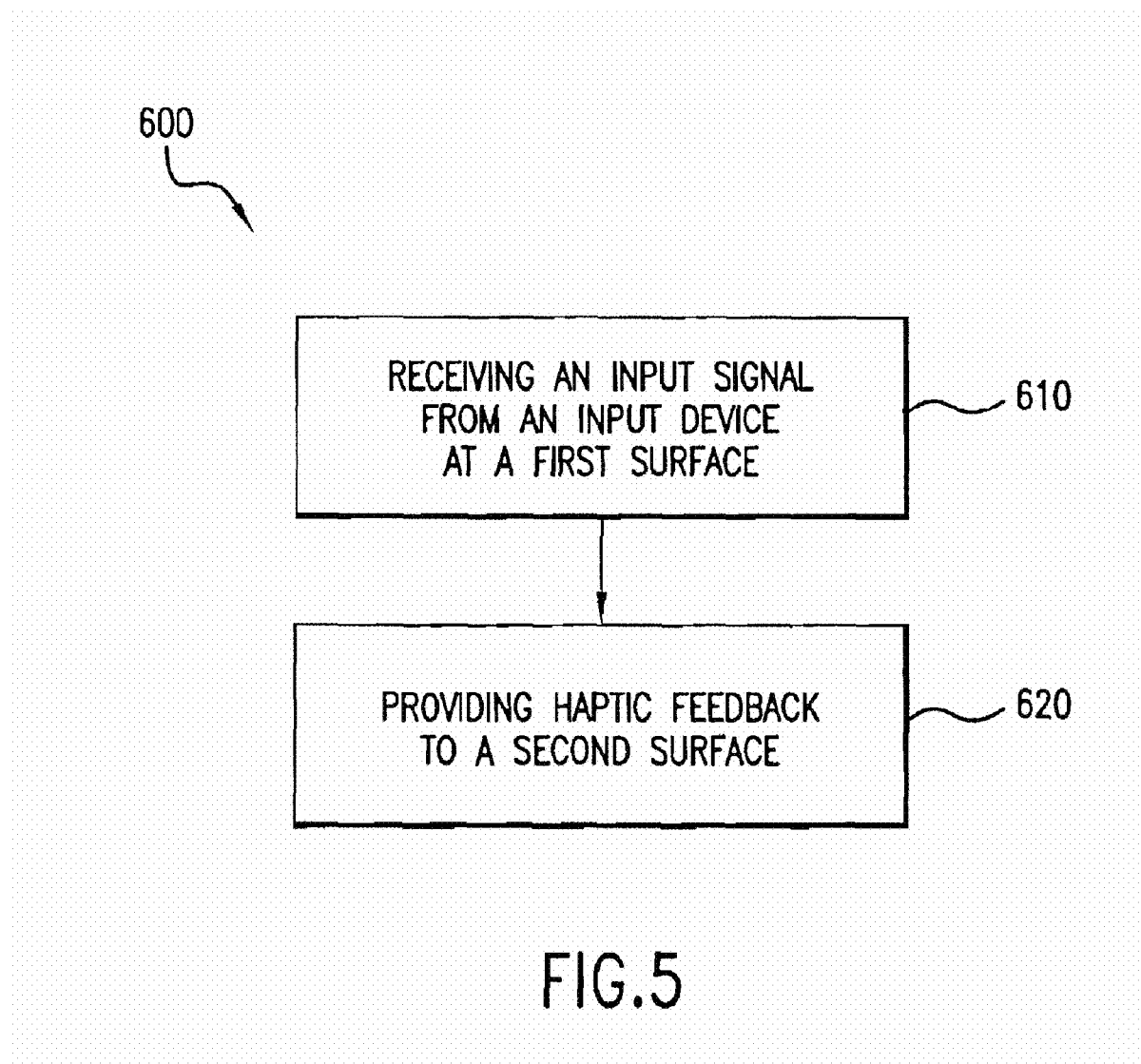
FIG. 5 is a block diagram of an embodiment of a method according to the present invention.

FIG. 5 shows an embodiment of a method 600 of providing haptic feedback to a location other than an input area. The method 600 may be employed in the phone 100 described above, and items shown in FIGS. 1-4 are referred to in describing FIG. 5 to aid understanding of the embodiment 600 shown. However, embodiments of methods according to the present invention may be employed in a wide variety of devices, including, without limitation, gamepads, PDAs, pagers, and automotive structures.

Referring to FIG. 5, a user activates an input device (such as a button 112) on a first area 110 of the mobile telephone 100. The input device 112 provides an input signal, comprising an indication that the input device 112 has been activated. In the embodiment shown, the input signal is received by a local processor (not shown) within the device 100. In other embodiments, the input signal is received by an actuator, a remote processor, or other product.

Still referring to FIG. 5, the next step 620 in the method shown 600 comprises providing haptic feedback to a second area 120 that is different from the input device 112. In the embodiment shown, this step 620 comprises the local processor sending an actuation signal to an actuator 160 that is in communication with the second area 120. The actuation signal comprises an indication that the actuator 160 should actuate (e.g., vibrate). The actuator 160 receives the actuation signal, and actuates. The communication between the second area 120 and the actuator 160 is configured such that the actuator's actuation provides haptic feedback (in the form of vibrations in the embodiment shown) to the second area 120. In other embodiments, this step 620 may comprise the actuator 160 receiving the input signal from the input device, and then actuating to provide haptic feedback to the second area 120.

Referring still to the embodiment shown in FIG. 5, different input signals generate different actuation signals, and different input devices are configured to provide different input signals. In other embodiments, the processor includes an algorithm that is configured to provide desired haptic feedback in response to designated input signals or series of input signals.

As discussed above, in one embodiment, the actuator is a voice coil. Alternatively, the actuator can be a piezoceramic material. The operation of actuators has been described above and will not be repeated here. The actuator is in communication with a feedback area. The actuator can provide haptic feedback by actuating the feedback area. As discussed above, different haptics are provided by regulating the current delivered to the actuator, the duration of the current delivered to the actuator, the time between cycles of energizing the actuator, and the number of cycles of energizing the actuator. These conditions can be varied to produce a variety of haptics to the feedback area.

Figure 6:
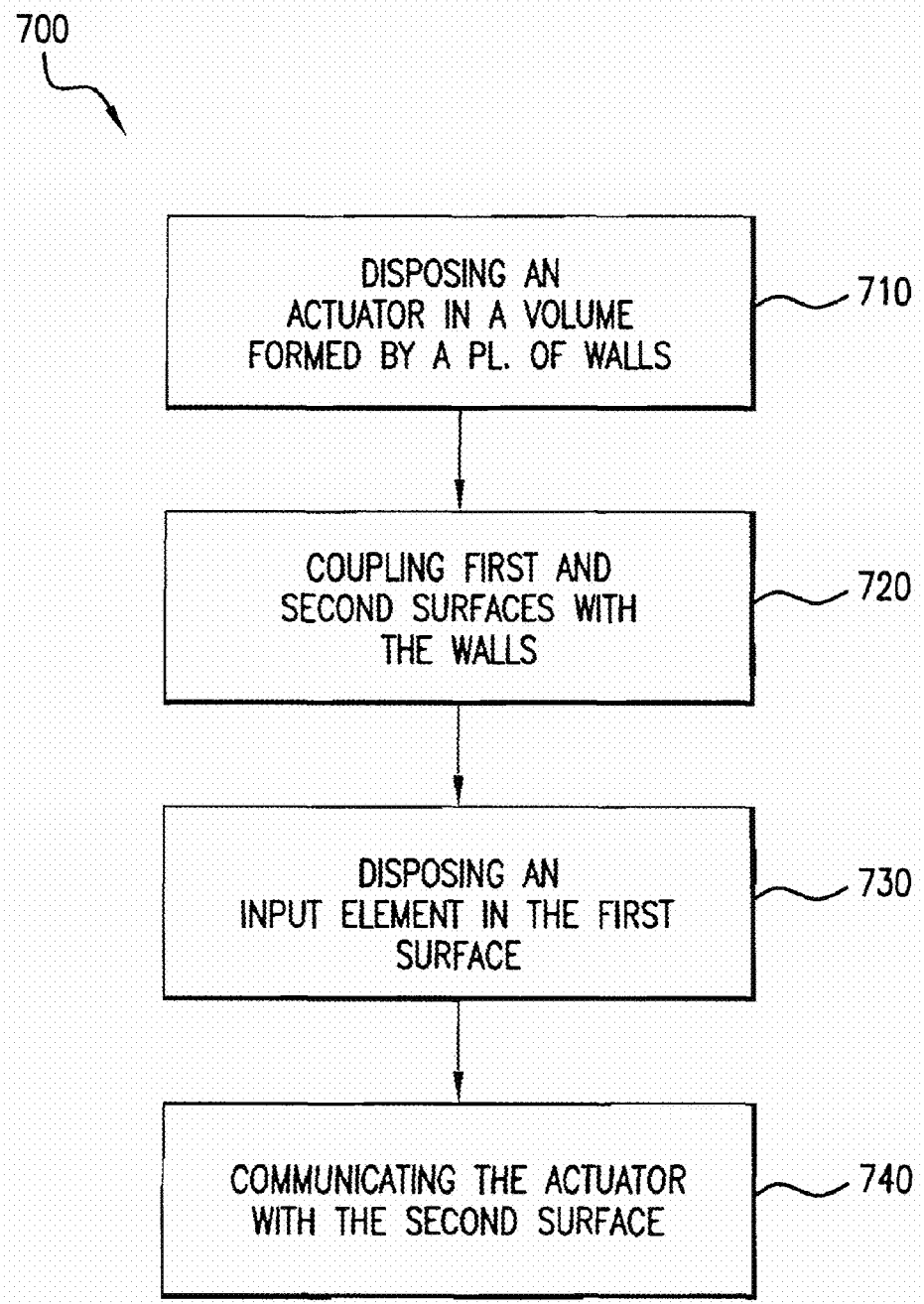
FIG. 6 is a block diagram of another embodiment of a method according to the present invention.

FIG. 6 shows an embodiment of a method 700 of providing haptic feedback to a feedback area of a device, such as the phone 100 described above. As indicated by block 710, the method 700 includes disposing an actuator in a volume formed by a plurality of walls. As discussed above, the actuator can be formed from a voice coil and a permanent magnet. Alternatively, the actuator can be formed of a piezo material, such as quartz, Rochelle Salt, and synthetic polycrystalline ceramics. In one embodiment, the actuator is coupled to a rigid surface disposed in the volume, and is electrically connected to a power supply and a processor disposed in the volume. Alternatively, the actuator can be configured to communicate with a remote power supply. Likewise, the actuator can be configured to communicate with a remote processor. For example, the actuator can be configured to communicate with a remote processor wirelessly.

As indicated by block 720, the method 700 includes coupling an input area and a feedback area with the walls. Preferably, the input and feedback areas are distinct. In one embodiment, the input and feedback areas are separate from one another. Alternatively, the input and feedback areas can be contiguous. As shown by block 730, the method includes disposing an input element in the input surface. As described above, the input element is preferably a keypad, a switch, and a touch-sensitive screen. Alternative input elements are described above.

As indicated by block 740, the method includes communicating the actuator with the feedback area. As described above, the actuator can directly contact the feedback area. With reference to the embodiment of the apparatus described above, the actuator magnet can be coupled directly to the feedback area. Alternatively, the actuator can be indirectly coupled to the feedback area. For example, the actuator can transmit energy, such as sound waves or electromagnetic pulses to the feedback area. In one embodiment, the method 700 includes disposing a coupling between the actuator and the feedback area. In one embodiment, the coupling is a mechanical linkage although any other suitable coupling can be used. The method 700 further includes communicating one end of the coupling with the actuator and communicating the other end of the coupling with the feedback area. In another embodiment, the method 700 includes actuating the feedback area at a first frequency. In one embodiment, the first frequency is in a range between approximately 10 Hz and 300 Hz.

In one embodiment the method 700 includes forming at least one groove in the feedback area. The configuration, i.e., length, depth, width, number, and shape, of the grooves can be varied to obtain varying resonant characteristics of the feedback area. Actuating the off-activating surface with a voice coil and a permanent magnet has been described above.

Alternate embodiments of the apparatus according to the present invention will next be described with reference to FIGS. 7-17. Descriptions of like structures with the previously-described embodiments will not be repeated.

Figure 7:
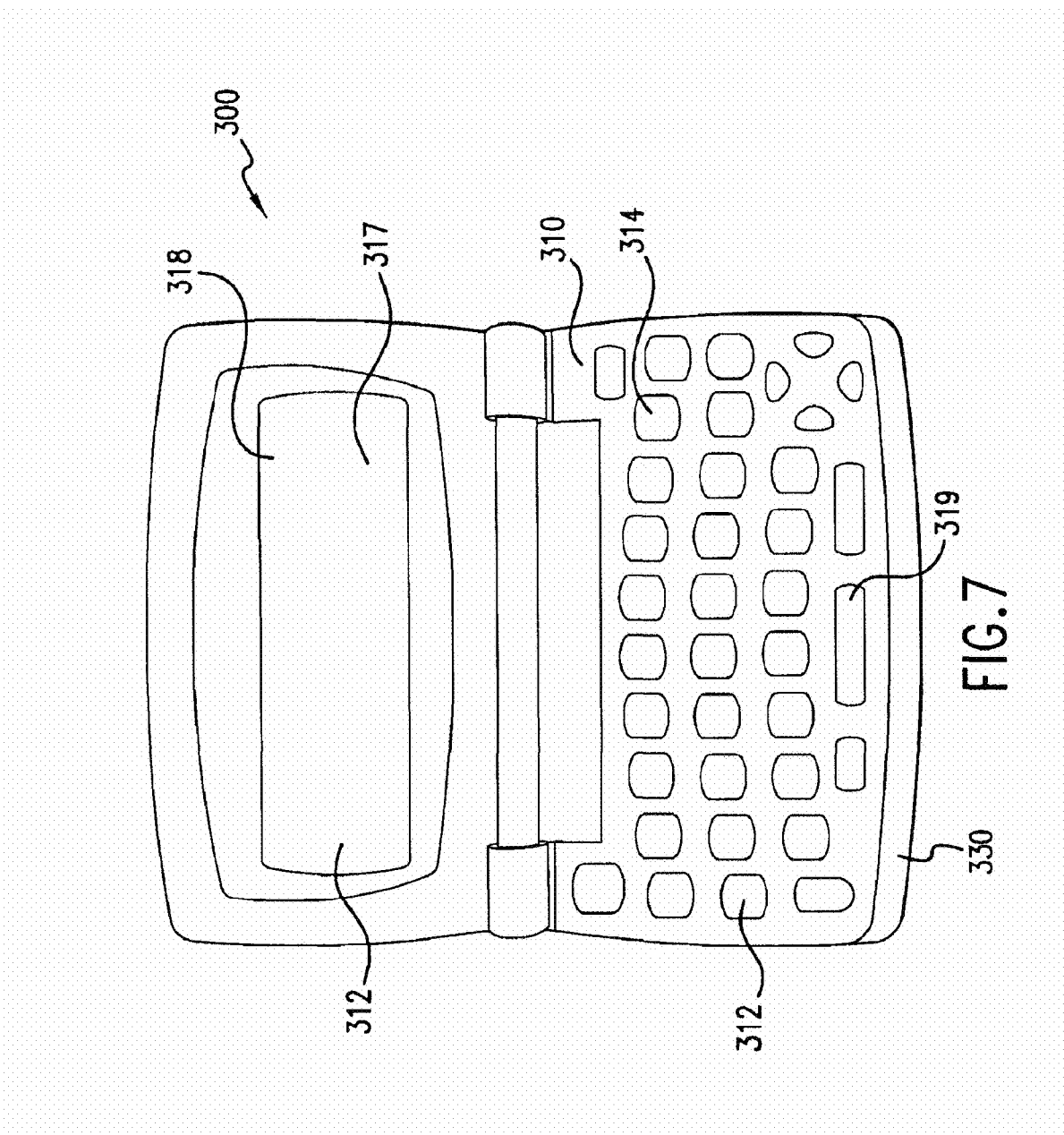
FIG. 7 is a perspective view of a text communication device according to another embodiment of the present invention.

FIG. 7 shows a perspective view of a text communication device 300 according to another embodiment of the present invention. An input surface 310 of the text communication device 300 preferably includes a plurality of input elements 312, a display screen 317, and a base 319. The plurality of input elements 312 includes a keypad 314 and a touch-sensitive screen 318 disposed in the display screen 317. Alternatively, there may only be one input element 312, such as a touch-sensitive screen 318.

Figure 8:
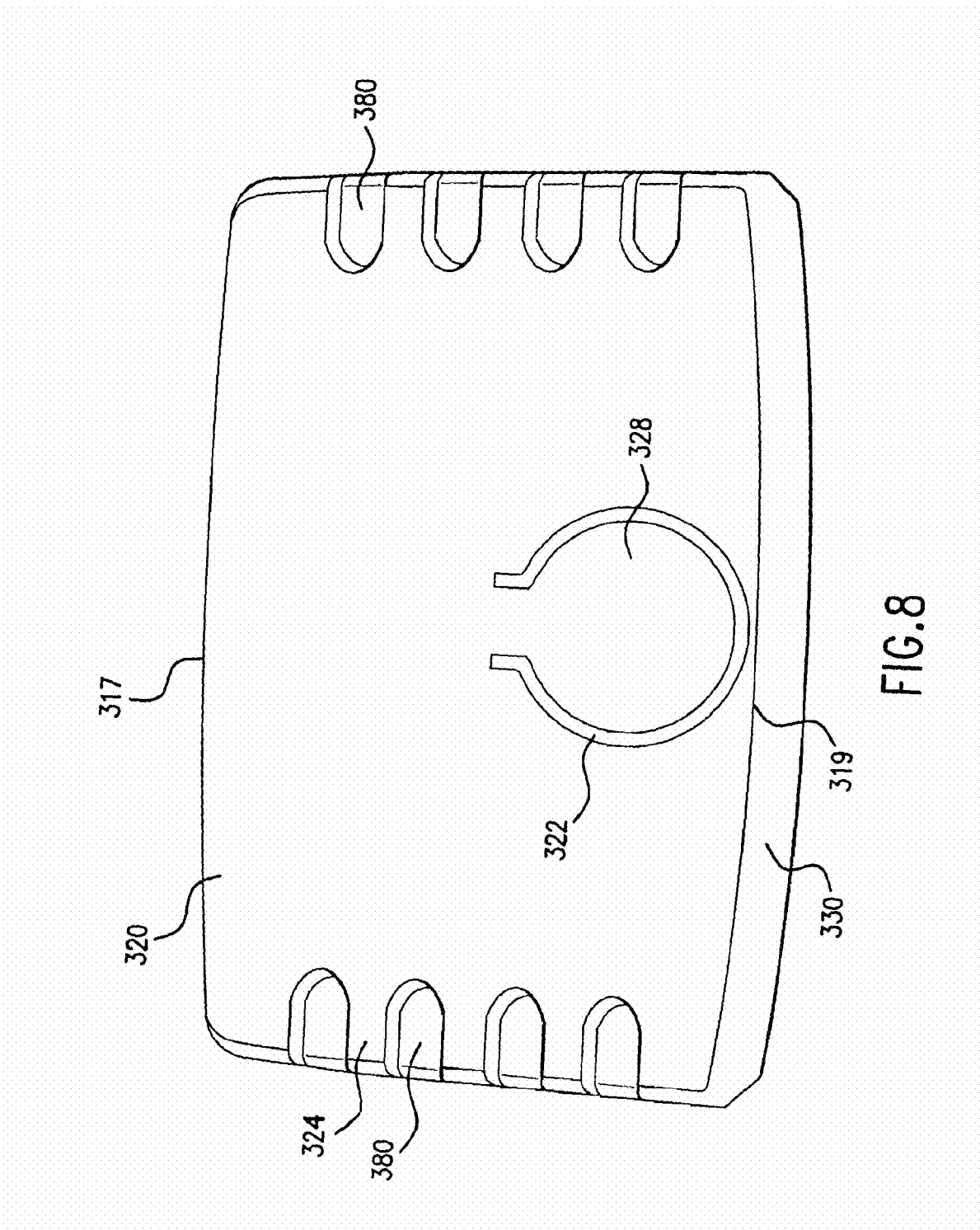
FIG. 8 is a perspective view of an off-activating area of the text communicating device of FIG. 7.

Referring now to FIG. 8, a perspective view of an off-activating surface 320 of the text communication device 300 of FIG. 7 is shown. The off-activating surface 320 includes an exterior surface 324. Disposed in the exterior surface 324 of the off-activating surface 320 are a groove 322 and a plurality of channels 380. The channels 380 shown are recessed to accept digits of a hand. The channels 380 guide a user's hand when holding the text communication device 300 and maximize the amount of physical contact between the hand and the off-activating surface 320.

The groove 322 is formed through an entire thickness of the off-activating surface 320. Preferably, the groove 322 is substantially continuous and forms a substantially circular panel 328 in the off-activating surface 320. Alternatively, the groove 322 can form any other suitable configuration. In this embodiment, the panel 328 is cantilevered from the off-activating surface 320. Thus, the off-activating surface 320 does not actuate with a uniform frequency. For example, the portion of the panel 328 proximate the base 319 actuates with a greater frequency than the off-activating surface proximate the display screen 317. The actuator (not shown) is disposed proximate the panel 328. As described above, the actuator is in one embodiment coupled directly to the panel 328. Alternatively, the actuator can be coupled indirectly with the panel 328.

Figure 9:
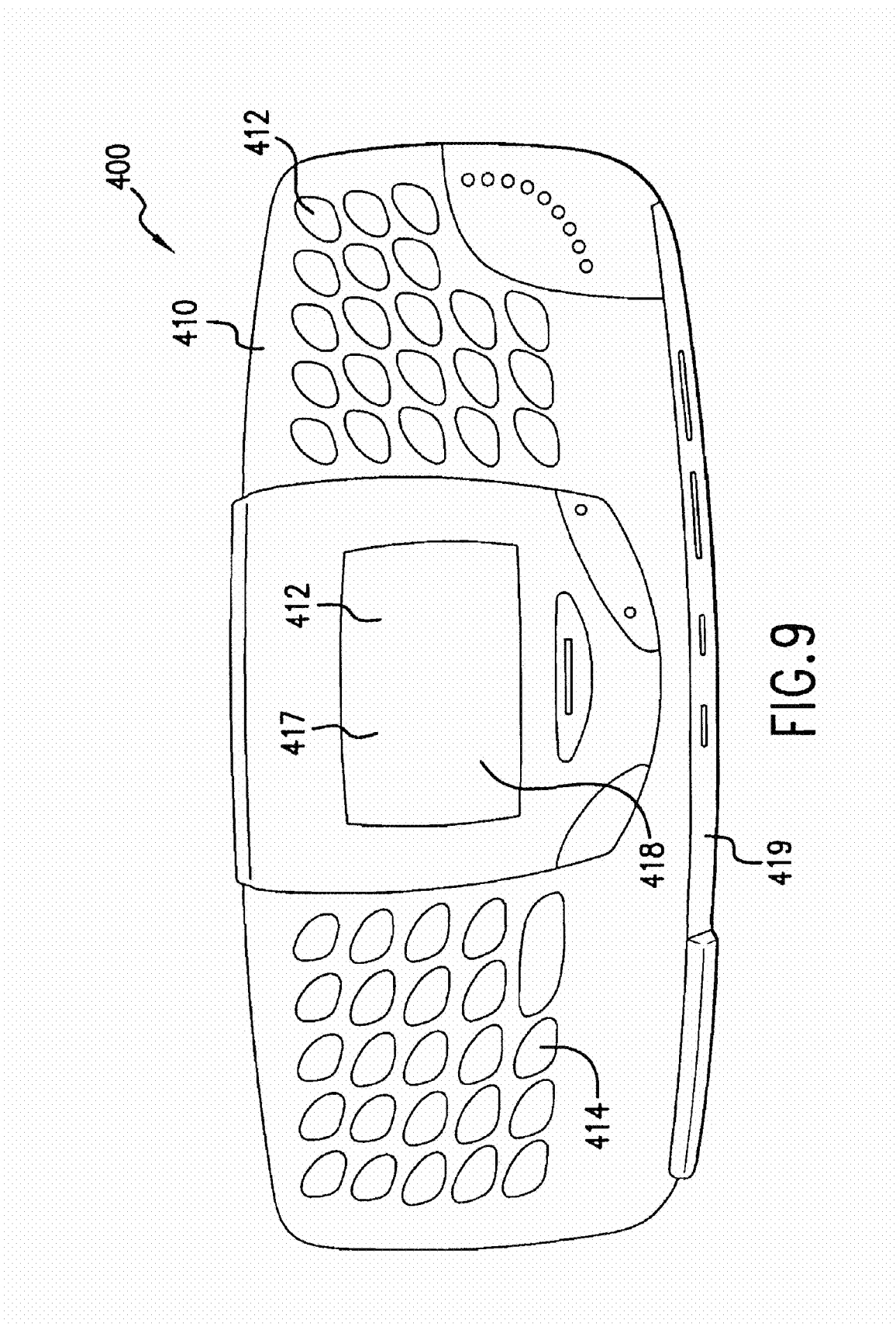
FIG. 9 is a perspective view of a second mobile phone according to another embodiment of the invention.

Referring now to FIG. 9, a perspective view of a mobile phone 400 according to another embodiment of the invention is shown. An input surface 410 of the mobile phone 400 includes a plurality of input elements 412, a display screen 417, and a base 419. In one embodiment, the input elements 412 include a keypad 414 and a touch-sensitive screen 418 disposed in the display screen 417. Alternatively, there can only be one input element 412, such as the touch-sensitive screen 418.

Figure 10:
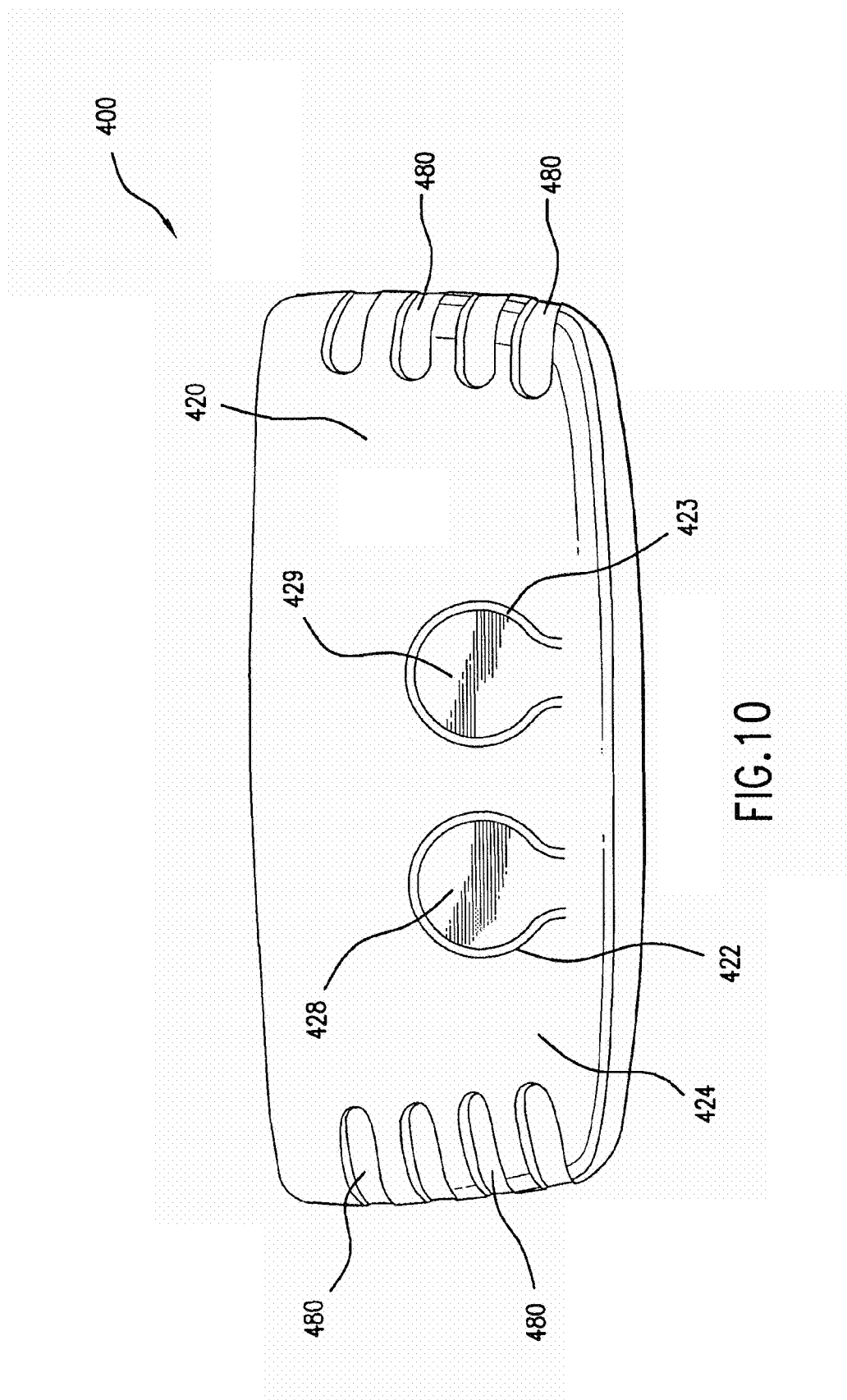
FIG. 10 is a plan view of an off-activating area of the mobile phone of FIG. 9.

Referring now to FIG. 10, a perspective view of an off-activating surface 420 of the mobile phone 400 of FIG. 9 is shown. The off-activating surface 420 includes an exterior surface 424. Disposed in the exterior surface 424 of the off-activating surface 420 are first and second grooves 422 and 423 and a plurality of channels 480. The channels 480 shown are recessed to accept digits of a hand. The channels 480 guide a user's hand when holding the phone 400 and maximize the amount of physical contact between the hand and the off-activating surface 420.

The first and second grooves 422 and 423 are formed through an entire thickness of the off-activating surface 420. In one embodiment, the first and second grooves 422 and 423 have substantially the same configuration. Alternatively, the first and second grooves 422 and 423 can be formed of different configurations. In one embodiment, the first and second grooves 422 and 423 are substantially continuous and form substantially circular first and second panels 428 and 429 in the off-activating surface 420. Alternatively, the first and second grooves 422 and 423 can form any other suitable panel.

In this embodiment, first and second panels 428 and 429 are cantilevered from the off-activating surface 420. Thus, the off-activating surface 420 does not actuate with a uniform frequency. For example, first and second panels 428 and 429 proximate the display screen 417 actuate with a greater frequency than the off-activating surface 420 proximate the base 419.

In one embodiment, a first actuator (not shown) is disposed proximate the first panel 428 and a second actuator (not shown) is disposed proximate the second panel 429. Alternatively, a single actuator (not shown) can be coupled with both or either the first and second panels 428 and 429, as required. As described above, the first and second actuators can be coupled directly to the first and second active panels 428 and 429. Alternatively, the first and second actuators can be coupled indirectly with the first and second active panels 428 and 429. The single actuator can be coupled directly or indirectly with the first and second active panels 428 and 429.

Figure 11:
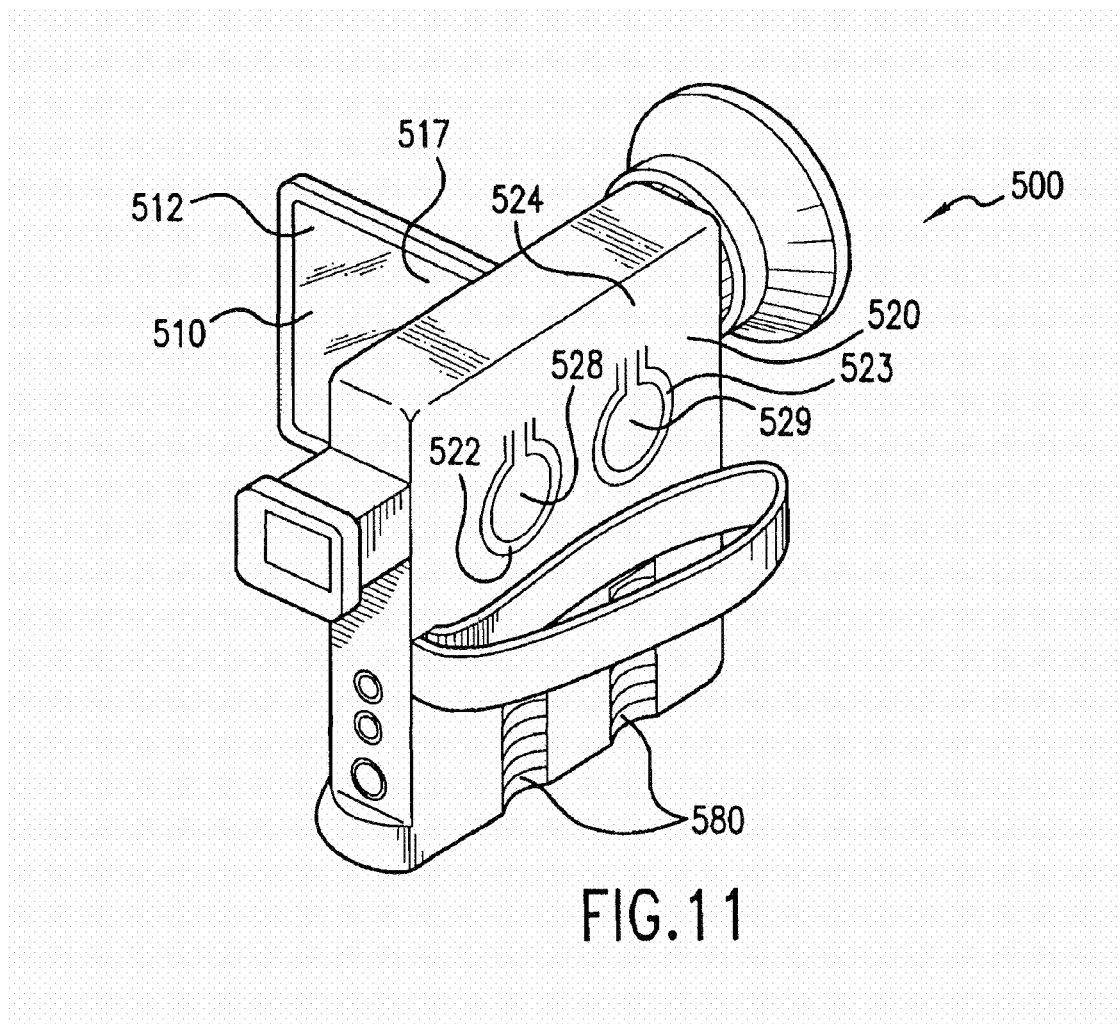
FIG. 11 is a perspective view of a camcorder according to another embodiment of the invention.

Referring now to FIG. 11, a camcorder 500 according to another embodiment of the invention is shown. An input surface 510 of the camcorder 500 includes an input element 512. The input element 512 shown is a touch-sensitive screen, which is disposed in a display screen 517. When the input surface 510 is fully extended, it is disposed substantially orthogonal to an off-activating surface 520. The off-activating surface 520 includes an exterior surface 524. Disposed in the exterior surface 524 are first and second grooves 522 and 523 and a plurality of channels 580.

As described above, the channels 580 shown are recessed to accept digits of a hand. The channels 580 guide a user's hand when holding the camcorder 500 and maximize the amount of physical contact between the hand and the off-activating surface 520. In one embodiment, first and second grooves 522 and 523 are formed through an entire thickness of the off-activating surface 520. Alternatively, the first and second grooves 522 and 523 can be formed partially through the thickness of the off-activating surface 520.

In one embodiment, the grooves 522 and 523 have substantially the same configuration. Alternatively, the grooves 522 and 523 can be formed of different configurations. For example, the grooves 522 and 523 can be formed linearly and substantially along a perimeter of the off-activating surface 520, similar to that described above in FIGS. 1-4. In one embodiment, the grooves 522 and 523 are substantially continuous and form substantially circular first and second panels 528 and 529 in the off-activating surface 520. Alternatively, the first and second grooves 522 and 523 can form any other suitable panel.

The first and second panels 528 and 529 are cantilevered from the off-activating surface 520. As described above, the off-activating surface 520 does not actuate with a uniform frequency. As described above, a first actuator (not shown) is disposed proximate the first panel 528 and a second actuator (not shown) is disposed proximate the second panel 529. Alternatively, a single actuator (not shown) can be coupled with both or either the first and second panels 528 and 529, as required. As described above, the first and second actuators can be coupled directly with the first and second panels 528 and 529. Alternatively, the first and second actuators can be coupled indirectly with the first and second panels 528 and 529. The single actuator can be coupled directly or indirectly with the first and second panels 528 and 529.

Figure 12:
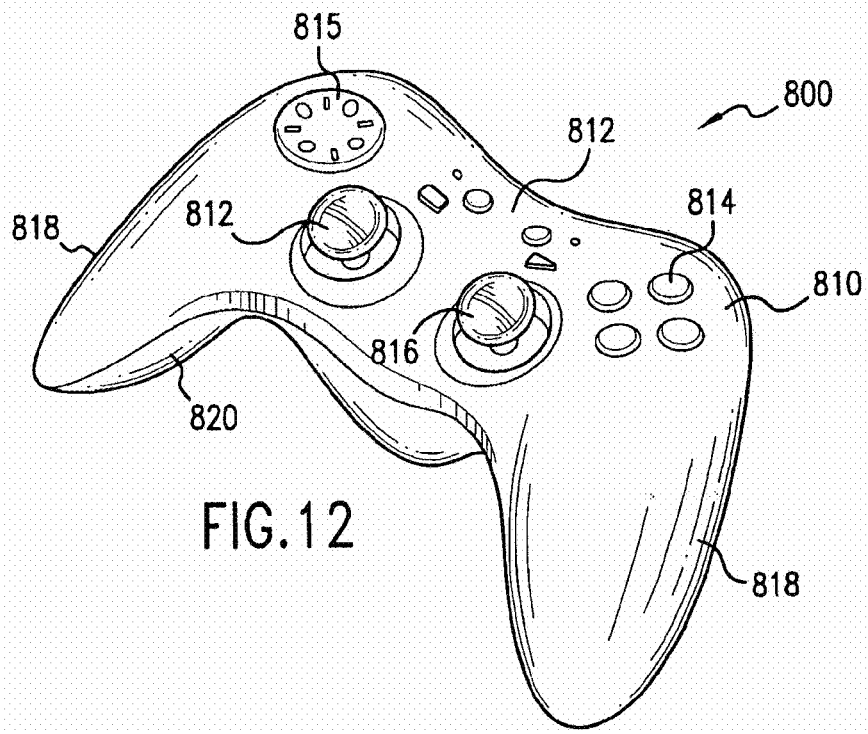
FIG. 12 is a perspective view of a gamepad according to another embodiment of the invention.

FIG. 12 shows a perspective view of a gamepad 800 according to another embodiment of the invention. An input surface 810 of the gamepad 800 includes a plurality of input elements 812, including buttons 814, a directional controller 815, and joysticks 816. Alternatively, any other suitable number or combination of input elements can be used. The gamepad 800 also includes two wings 818 to facilitate grasping the device with two hands.

Figure 13:
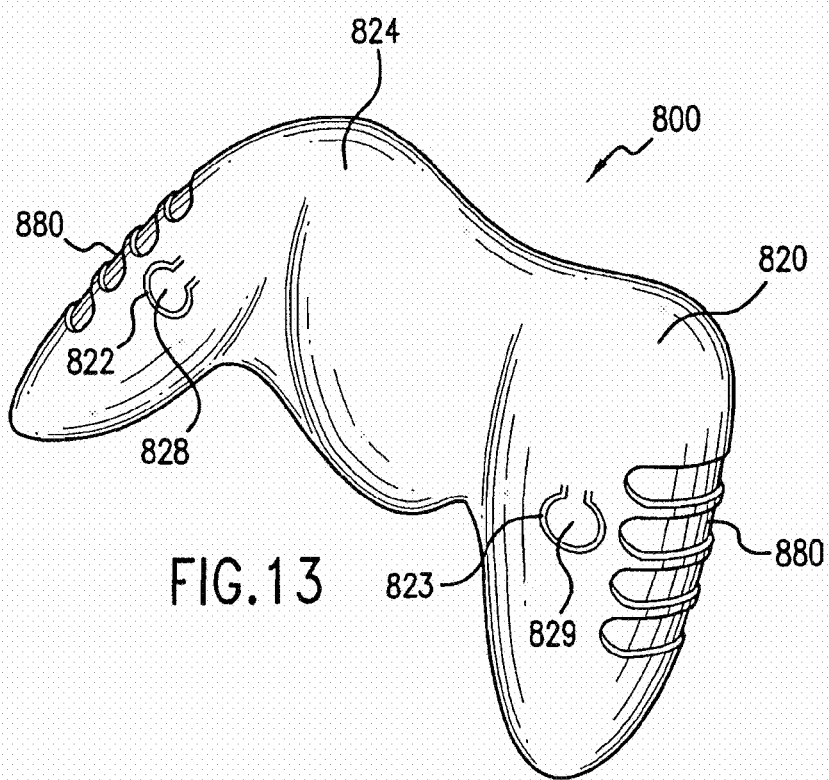
FIG. 13 is a perspective view of an off-activating surface of the gamepad of FIG. 12.

As shown in FIG. 13, the gamepad 800 includes an off-activating surface 820. The off-activating surface 820 includes an exterior surface 824. Disposed in the exterior surface 824 are first and second grooves 822 and 823 and a plurality of channels 880. The first and second grooves 822 and 823 and the channels 880 are formed proximate the wings 818.

The channels 880 shown are recessed to accept digits of a hand. The channels 880 guide a user's hand when holding the gamepad 800 and maximize the amount of physical contact between the hand and the off-activating surface 820. In one embodiment, first and second grooves 822 and 823 are formed through an entire thickness of the off-activating surface 820. In one embodiment, the grooves 822 and 823 have substantially the same configuration. Alternatively, the grooves 822 and 823 can be formed of different configurations. For example, the grooves 822 and 823 can be formed to substantially follow the perimeter of the wings 818. In one embodiment, the grooves 822 and 823 are substantially continuous and form substantially circular first and second panels 828 and 829 in the off-activating surface 820. Alternatively, the first and second grooves 822 and 823 can form any other suitable panel.

The first and second panels 828 and 829 are cantilevered from the off-activating surface 820. In one embodiment, the first and second panels 828 and 829 are also input elements 812. As described above, the off-activating surface 820 does not actuate with a uniform frequency. In one embodiment, a first actuator (not shown) is disposed proximate the first panel 828 and the second panel 829. Alternatively, a single actuator (not shown) can be coupled with both or either the first and second panels 828 and 829, as required. The first and second actuators can be coupled indirectly with the first and second panels 828 and 829.

One problem associated with "soft" keyboards (e.g., a "keyboard" user interface displayed and implemented with a touch screen) is a lack of tactile feedback to a user of the soft keyboard. Replacing mechanical keys with keys on the soft keyboard remove tactile information provided by the mechanical keys when pressing as well as 1) the static haptic information provided by the edges of the mechanical keys, and 2) the kinesthetic information provided by the normal travel of the button when pressed.

Certain forms of haptic feedback have brought back part of the tactile information in the form of "clicks" generated by, for example, vibrating motors. However this haptic feedback still does not completely recreate completely the interaction of the original mechanical keys. As a result, the interaction with soft keyboards may be slow, and not satisfying from a user experience point of view.

Another problem associated with soft keyboards is occlusion with the soft keyboards implemented in hand held devices. The size of the keys can be very small and even medium size fingers may partially cover, and in some cases completely cover, more than one key at the time. This often results in an incorrect key being recognized as being pressed, thereby slowing down text entry and increasing the error rate of soft keyboards when compared to mechanical keyboards in hand held devices.

Figure 14:
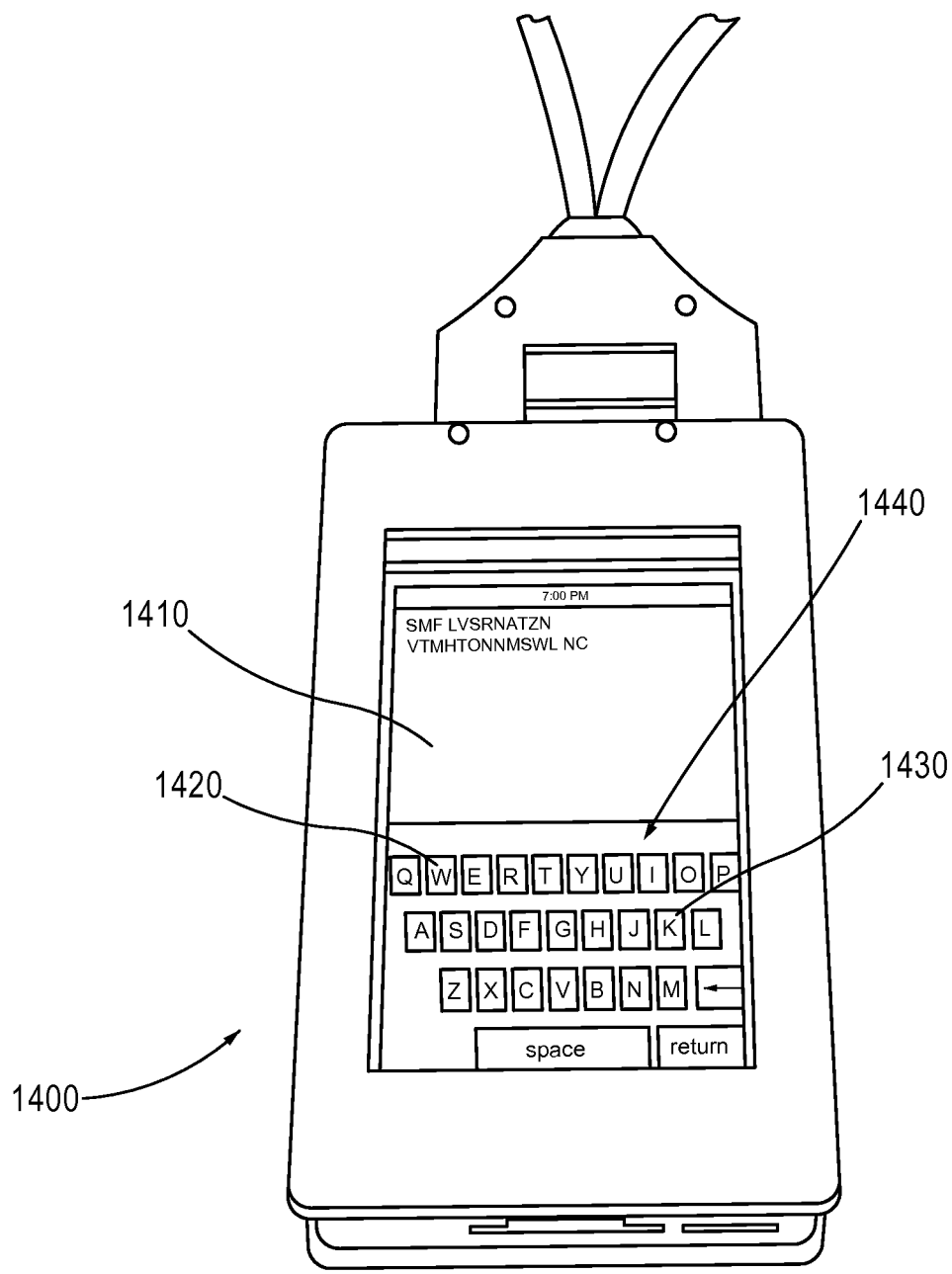
FIG. 14 is a perspective view of a touch surface of a device according to various embodiments of the invention.

FIG. 14 illustrates a perspective view of a touch surface 1410 of a device 1400 according to various embodiments of the invention. As illustrated, touch surface 1410 includes a soft keyboard 1440 having a plurality of keys such as a first key 1420 and a second key 1430. While described in reference to soft keyboard 1440, the invention is not so limited and may pertain to various soft keys implemented in connection with a touch screen as would be appreciated.

Figure 15:
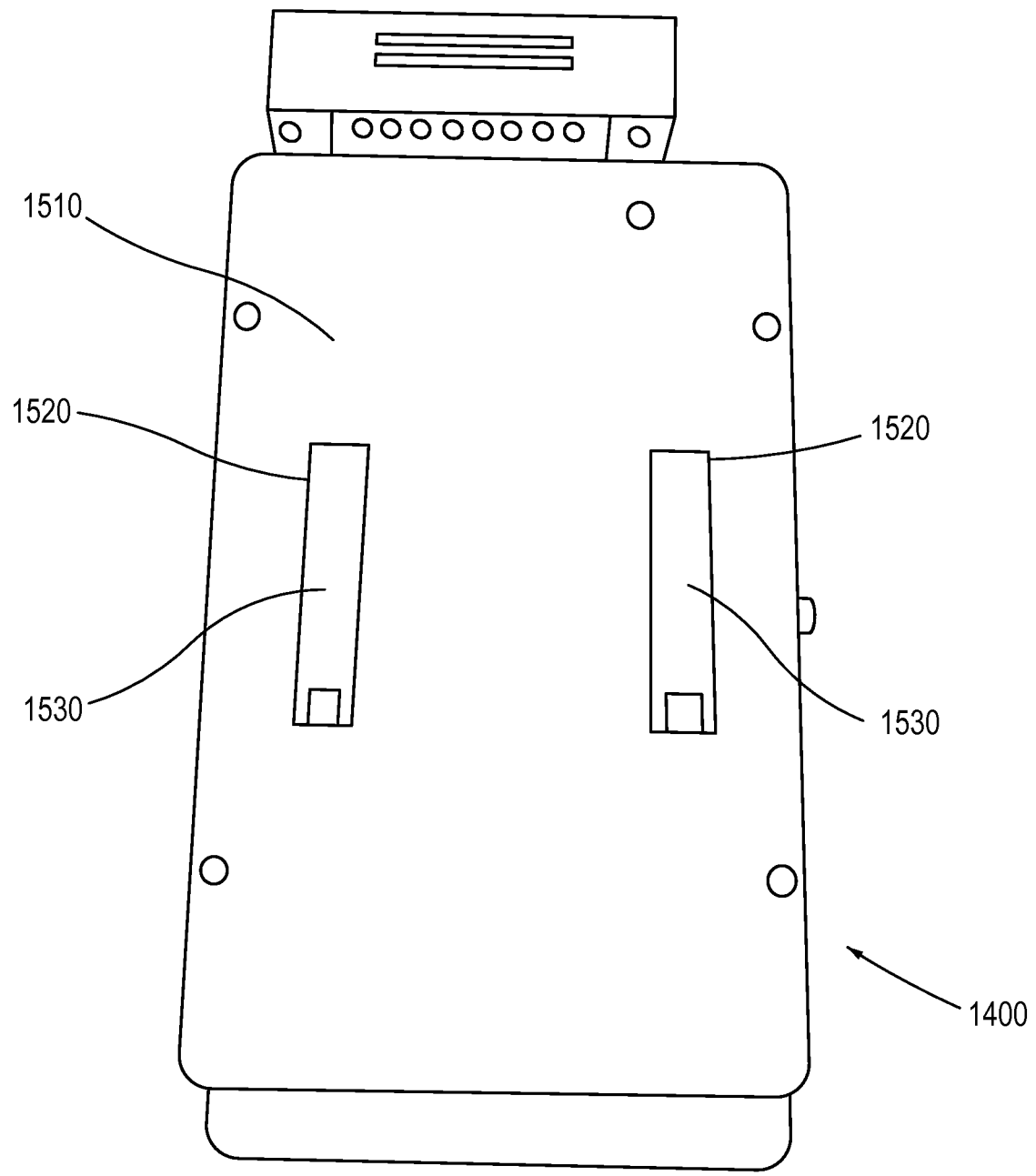
FIG. 15 is a perspective view of an off-activating surface of a device according to various embodiments of the invention.

FIG. 15 illustrates a perspective view of an off-activating surface 1510 of device 1400 according to various embodiments of the invention. As illustrated, off-activating surface 1510 includes two portions 1520, each of which has disposed therein an actuating paddle 1530. While two actuating paddles 1530 are illustrated in FIG. 15, other numbers of actuating paddles may be used. While actuating paddles 1530 are illustrated as vertically arranged, horizontally aligned with one another, and substantially parallel, other configurations may be used. For example, actuating paddles 1530 may be horizontally arranged; aligned with vertical and/or horizontal offsets from one another, and/or not parallel. Other configurations may be used as would be appreciated. While actuating paddles 1530 are illustrated in FIG. 15 as a block, any shape and/or size may be used, symmetrical or otherwise as would be appreciated. Portions 1520 in one embodiment are rubber housing that allows a user to feel the rotation of paddles 1530 through the rubber.

According to various embodiments of the invention, either or both of actuating paddles 1530 operate in connection with a user touching (or in some implementations proximate to) a key, such as key 1420, or an edge of a key. In some embodiments of the invention, as a user holds device 1400 with thumbs proximate to touch surface 1410 and other fingers proximate to off-activating surface 1510, one or both of actuating paddles 1530 provide haptic feedback to the user's other fingers as the user passes his/her thumbs over, across, or on a key, such as key 1420. In particular, actuating paddles 1530 provide haptic feedback to the user in connection with an edge being traversed by at least one thumb. While described as operating in connection with thumbs on touch surface 1520, other digits may be used, for example, when the user holds device 1400 in one hand and uses, for example, an index finger on another hand to interact with touch surface 1410.

In some embodiments of the invention, actuating paddle 1530 moves when actuated to provide the haptic feedback. In some embodiments of the invention, actuating paddle 1530 moves by rotating back and forth by a small amount (e.g., 1-10 degrees or more) when actuated. In some embodiments, actuating paddle 1530 moves by rotating in a first direction in response to a digit moving left to right over touch screen 1410 and/or in a second direction in response to a digit moving right to left over touch screen 1410. In some embodiments, actuating paddle 1530 moves by rotating by an amount in a first direction from a rest position and then returns to the rest position by rotating by the amount in the reverse direction. In some embodiments of the invention, actuating paddle 1530 moves by longitudinally translating by some amount when actuated. In some embodiments of the invention, actuating paddle 1530 moves by rotating and longitudinally translating in response to a digit moving over touch screen 1410. In some embodiments of the invention, actuating paddle 1530 moves by translating in and out with respect to off-activating surface 1510.

In some embodiments of the invention, the actuating paddle 1530 that is proximate to a user's right hand fingers provides haptic feedback to the user when the right thumb passes over, across or on a key. In some embodiments of the invention, the actuating paddle 1530 that is proximate to a user's left hand fingers provides haptic feedback to the user when the left thumb passes over, across or on a key. In some embodiments of the invention, both actuating paddles 1530 may move in response to fingers moving over, across, or on a key.

In some embodiments of the invention, device 1400 includes one or more detectors (not otherwise illustrated) for determining which hand is holding device 1400. In some embodiments of the invention, device 1400 includes one or more detectors for determining whether both hands are holding device 1400. In these embodiments of the invention, either or both actuating paddles 1530 may provide haptic feedback to the user depending on whether either or both hands are holding device 1400.

In some embodiments of the invention, when, for example, touch surface 1410 includes a capacitive touch screen, one or more actuating paddles 1530 may provide haptic feedback to the user as one or more of the user's digits "hover" over one or more keys on soft keyboard 1440. In this embodiment, the term "hover" could require either physical contact with a conventional touch screen, or close proximity to a more advanced touch screen that can sense the finger before it is in contact (i.e., a touch screen equivalent to a "mouse-over").

Figure 16A:
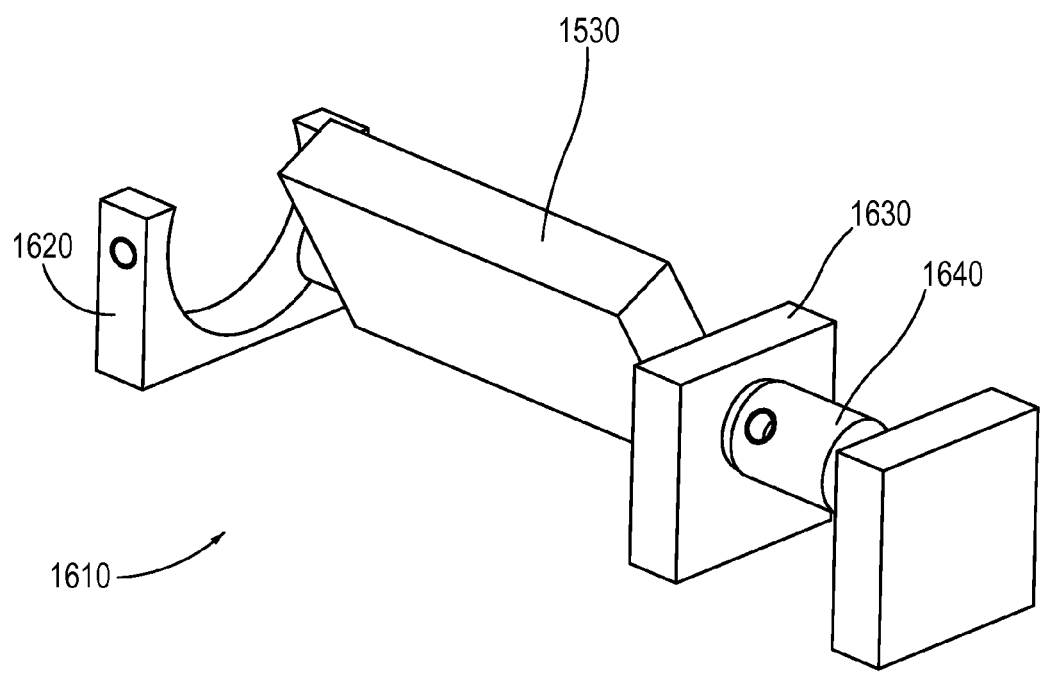
FIGS. 16A and 16B are perspective views of an actuating paddle assembly according to various embodiments of the invention.
Figure 16B:
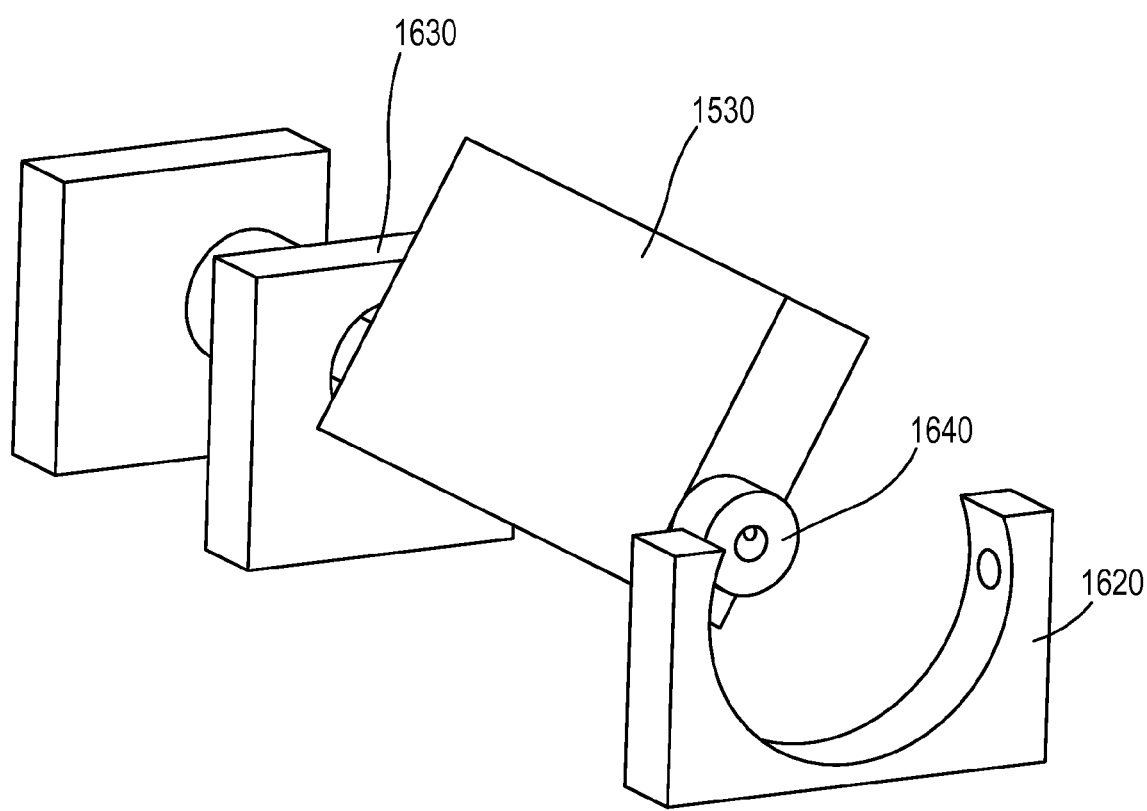

FIG. 16 illustrates views of an actuating paddle assembly 1610 from different perspectives according to various embodiments of the invention. Actuating paddle assembly 1610 includes actuating paddle 1530, a motor mount 1620, a bearing 1630, and an axle 1640. A motor (not otherwise illustrated in FIG. 16) rests in motor mount 1620 and is coupled to axle 1640. Axle 1640 is coupled to actuating paddle 1530 and bearing 1630. The motor drives axle 1640 in either direction thereby rotating paddle 1530 to generate haptic feedback.

Instead of rotating paddles 1530, in other embodiments different structures can be used to generate the haptic feedback on the oft-activating surface 1510 of device 1400. In one embodiment, piezoelectric material can be placed directly on surface 1510. The piezoelectric material will bow outwards when current is applied to it. The bowing can be felt by a user's fingers that are contacting the piezoelectric material. In this embodiment, the portion or housing 1530 may be eliminated because a user can directly contact the piezoelectric material. In one embodiment, the piezoelectric material may be Macro Fiber Composite ("MFC") material from Smart Material Corp., or may be any monolithic or composite piezo.

In one embodiment, the function of the paddle or piezoelectric material or strip is to push against or move the user's finger a small amount to generate haptic feedback. Any other type of actuator that can perform this function can be used. For example, a pin that moves up and down can be used as the actuator.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A handheld apparatus comprising:
a first surface that comprises a touch screen;
a second surface contiguous with the first surface, wherein the second surface is different from the first surface;
a processor; and
an actuator communicatively coupled to the processor and physically coupled to the second surface;
wherein the first surface is adapted to detect a hovering object and the hovering object comprises a user input;
wherein the processor in response to the user input generates an actuation signal to the actuator to generate a non-vibratory haptic feedback; and
wherein the actuation signal causes the actuator to bow outwards to change a shape of the second surface that is direct contact with a hand of a user of the handheld apparatus, wherein the change of shape provides the haptic feedback;
wherein generating the non-vibratory haptic feedback comprises moving the hand of the user outwards during a first duration and the non-vibratory haptic feedback ends when the outward movement of the hand during the first duration has ended.

2. The apparatus of claim 1, wherein the second surface is formed of a flexible material that covers the actuator and that bows outward in response to the actuator bowing outwards.

3. The apparatus of claim 2, wherein the actuator comprises a piezoelectric material.

4. The apparatus of claim 2, wherein a portion of the second surface is eliminated for direct user contact with the actuator, wherein the actuator forms at least part of the second surface.

5. A method of generating haptic feedback on a handheld device that comprises a first surface that comprises a touch screen a second surface contiguous with the first surface, wherein the second surface is different from the first surface, a processor, and an actuator communicatively coupled to the processor and physically coupled to the second surface, the method comprising:
detecting at the first surface a hovering object, wherein the hovering object comprises a user input; and
in response to the user input, generating an actuation signal to the actuator to generate a non-vibratory haptic feedback;
wherein the actuation signal causes the actuator to bow outwards to change a shape of the second surface that is direct contact with a hand of a user of the handheld device, wherein the change of shape provides the haptic feedback;
wherein generating the non-vibratory haptic feedback comprises moving the hand of the user outwards during a first duration and the non-vibratory haptic feedback ends when the outward movement of the hand during the first duration has ended.

6. The method of claim 5, wherein the second surface is formed of a flexible material that covers the actuator and that bows outward in response to the actuator bowing outwards.

7. The method of claim 5, wherein the actuator comprises a piezoelectric material.

8. The method of claim 5, wherein a portion of the second surface is eliminated for direct user contact with the actuator, wherein the actuator forms at least part of the second surface.

9. A handheld device comprising:
a top surface adapted to be held by a user's thumbs and comprising a touch screen;
a bottom surface contiguous with and opposite the top surface, wherein the bottom surface is a different surface than the top surface;
a processor coupled to the touch screen; and
an actuator communicatively coupled to the processor and physically coupled to the bottom surface;
wherein the top surface is adapted to detect a hovering object and the hovering object comprises a user input;
wherein the processor in response to the user input generates an actuation signal to the actuator to generate a non-vibratory haptic feedback; and
wherein the actuation signal causes the actuator to bow outwards to change a shape of the bottom surface that is direct contact with a hand of a user of the handheld device, wherein the change of shape provides the haptic feedback;
wherein generating the non-vibratory haptic feedback comprises moving the hand of the user outwards during a first duration and the non-vibratory haptic feedback ends when the outward movement of the hand during the first duration has ended.

10. The device of claim 9, wherein the bottom surface is formed of a flexible material that covers the actuator and that bows outward in response to the actuator bowing outwards.

11. The device of claim 9, wherein the actuator comprises a piezoelectric material.

12. The device of claim 9, wherein a portion of the bottom surface is eliminated for direct user contact with the actuator, wherein the actuator forms at least part of the bottom surface.

* * * * *